Oct. 27, 1953     J. E. BRASSIE     2,656,603
INSTRUMENT FOR RELATING CASTS TO DENTAL ARTICULATORS
Filed Dec. 20, 1951     2 Sheets-Sheet 1
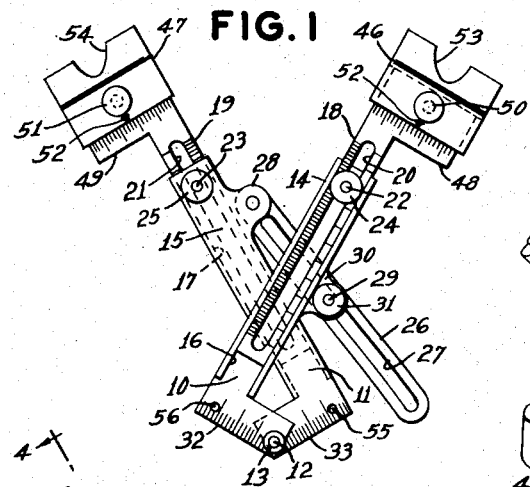
FIG. 1
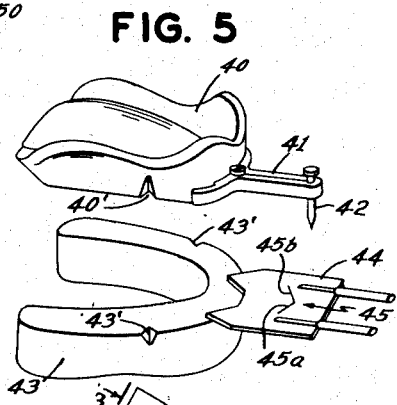
FIG. 5
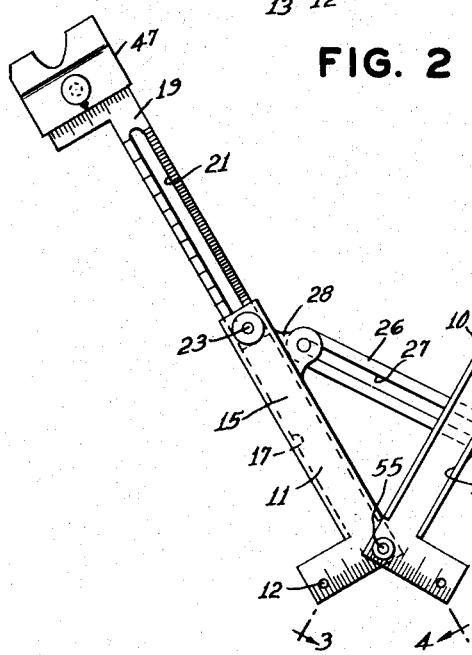
FIG. 2
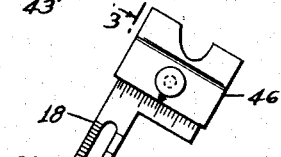
FIG. 6
FIG. 3
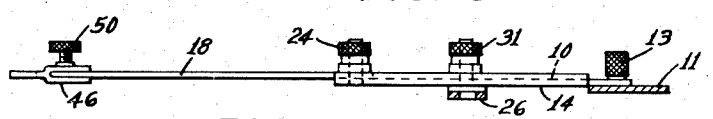
FIG. 4
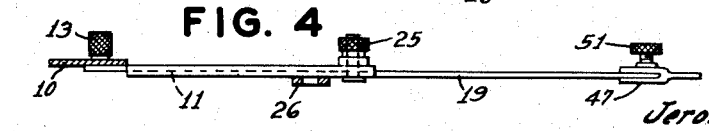
INVENTOR
*Jerome E. Brassie*
BY
ATTORNEYS

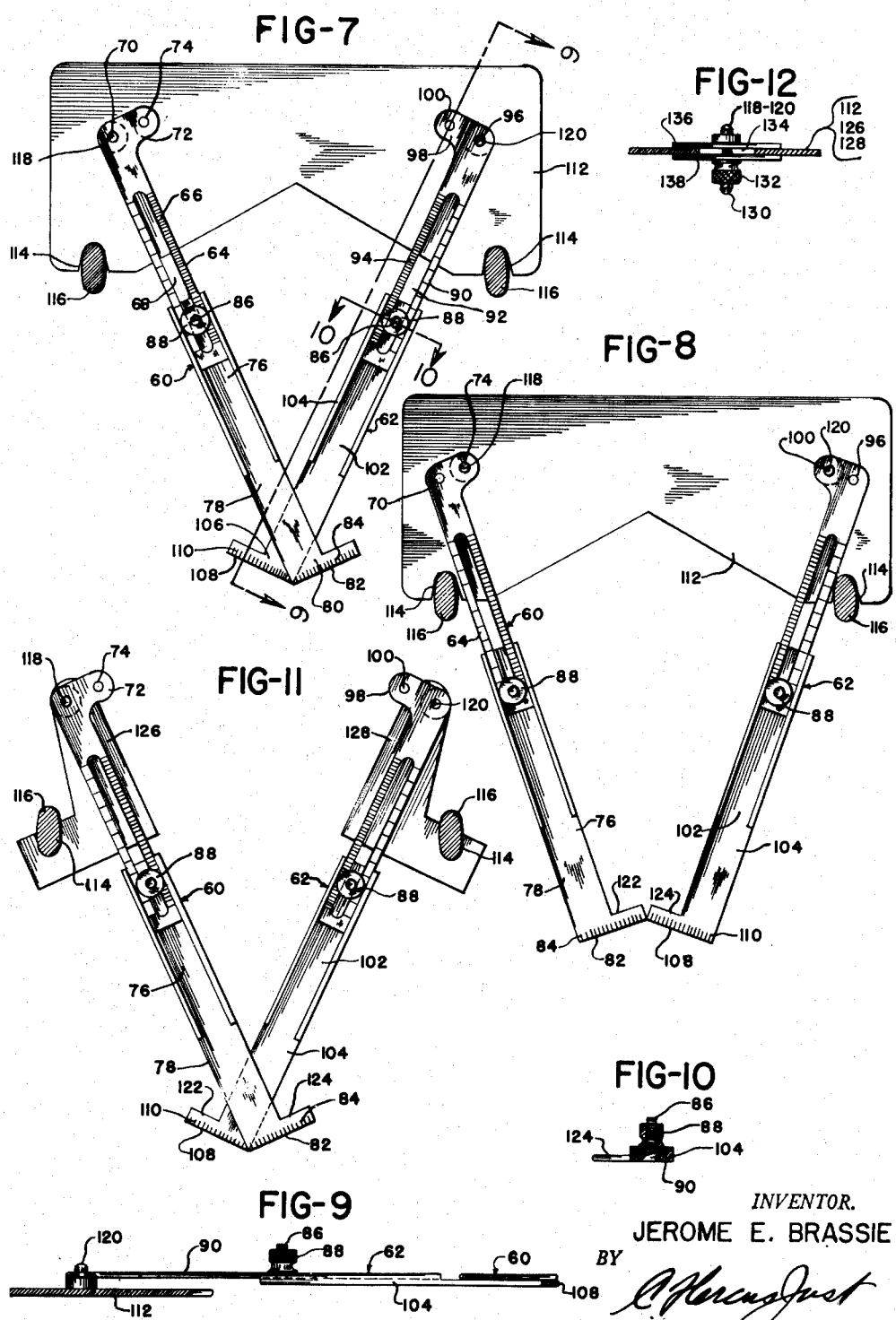

Patented Oct. 27, 1953

2,656,603

UNITED STATES PATENT OFFICE 2,656,603

INSTRUMENT FOR RELATING CASTS TO DENTAL ARTICULATORS

Jerome E. Brassie, York, Pa., assignor to The Dentists' Supply Company of New York, York, Pa., a corporation of New York Application December 20, 1951, Serial No. 262,609

26 Claims. (Cl. 32—32)

This invention relates to a device for use in prosthetic or restorative dentistry. More particularly the invention is concerned with a device which may aptly be termed a "kinematic relater" by which biteplates and their supporting casts may be readily and accurately related to and positioned within a mechanical articulator.

This application is a continuation-in-part of my application, Serial No. 125,011, filed November 2, 1949, for Improvements in Dental Instrument, now abandoned.

In constructing fixed or removable artificial dentures or bridgework, casts are first made of those areas of the patient's jaws which are to support them. Biteplates made of wax or modeling compound in which the artificial teeth are to be initially mounted are then made to fit on the casts, and the casts are mounted in a mechanical articulator which simulates the movements of the human jaw, or "the natural articulator," in the opening and closing thereof as well as in the lateral and protrusive motions thereof. In order to set the artificial teeth in the biteplates so that their cusps will properly mesh with one another and function in harmony with the movements of the patient's jaws, it is necessary to mount the casts and biteplates in the mechanical articulator in a relationship to its rotational centers identical to the relationship that the biteplates will have to the rotational centers of a patient's jaws when the biteplates and dentures have been mounted on the jaws. This is something which has been very largely neglected in the construction of artificial dentures, with the result that the dentures are inefficient and uncomfortable. A device known as the "face bow," planned to accomplish an accurate mounting of casts and their supported biteplates in a mechanical articulator, has been available to dentists for many years but has seldom been used. This is, perhaps, because it requires extra time and is awkward to use and transport to the dental laboratory. Furthermore, the face bow does not accomplish an accurate mounting relative to the lateral axes of rotation of the articulator. Nevertheless, whatever the reason for its non-use, the fact remains that the face bow has not been widely accepted and used in prosthetic dentistry.

My invention contemplates a small and inexpensive device which will accomplish the purpose of the face bow more accurately than does the face bow and without involving extra time or awkwardness or without involving problems of transportation. The device of my invention requires, for use, a Gothic arch tracing. There are at present a number of Gothic arch tracing devices in common use, some being of the extra-oral type and others being of the intra-oral type. One satisfactory way of obtaining a Gothic arch tracing is by mounting a small pin or marker on the upper or lower biteplate and a small plate or registering table, having a surface upon which the pin or marker will describe a line, or lines, on the other biteplate. When the biteplates, so equipped with the marker and registering table, are placed in the patient's mouth and his jaws moved in every possible direction and into every possible closed position, the marker will trace on the registering table a Gothic arch. The apex of the tracing represents the "centric" relationship of the lower jaw to the upper jaw, which is of primary import in the construction of artificial dentures. When the biteplates are removed from the patient's jaws and placed on their respective casts in the mechanical articulator, the marker will retrace the Gothic arch tracing contained on the surface of the registering table when the articulator is moved through the lateral excursions, if the casts are properly related to the rotational centers of the articulator. With or without a "face bow" positioning of the casts in the articulator, this is seldom, if ever, possible, and in order to make the marker follow the tracing when the biteplates and casts are placed in the articulator, it is necessary to change the positions of the casts by trial and error until the desired retracing of the Gothic arch is accomplished. This latter procedure is long and tedious and therefore not often followed, with the result that the biteplates and casts are not satisfactorily located in the articulator and the artificial teeth set therein are not properly set so that they will function in harmony when used by the patient.

My device, however, will properly and accurately position the casts and biteplates in the articulator. It is very simple in structure, one embodiment comprising merely a pair of longitudinally extensible members pivotally secured together at one end and having means at the pivoted end of each member defining a straight line at right angles to the longitudinal axis of said member. In another embodiment, a pair of longitudinally extensible members, operating on the same basic principle as the first embodiment, are respectively pivotally supported by a member or members fixedly supported by an artificial articulator. The function of the members in both embodiments is to erect a perpendicular on each of the two segments of the Gothic arch tracing. Ideally these perpendiculars should, when extended, pass through the vertical axes of lateral rotation of the patient's jaws and therefore through the vertical axes of lateral rotation of the mechanical articulator. For properly positioning a cast and its supported biteplate, provided with a Gothic arch tracing, in a mechanical articulator, the device is secured to the biteplate in such a manner that each of the straight lines, defined by the means at one end of each member, is coincident with, or in the same vertical plane as, the greatest straight line length of one segment of the Gothic arch tracing. Its extensible arms or members are then extended equal distances until points on the other ends thereof, through which the perpendiculars erected on the segments of the arch respectively pass, are the same distance apart as are the vertical rotational axes of the articulator. The assembly comprising the biteplate, its supporting cast, and the device attached to the biteplate is then placed in the articulator so that the points at the other ends of the extensible members of the device, above referred to, lie on the vertical rotational axes of the articulator. The cast is then attached to the articulator bow. The other assembly, comprising the other biteplate and its supporting cast, is then positioned and attached to the other articulator bow in alignment with the already positioned biteplate and cast by means of bite blocks which can be made when the biteplates are in the patient's mouth for the purpose of obtaining the Gothic arch tracing.

For a more detailed description of the several embodiments of my novel device, reference may be had to the accompanying drawings, in which:

Fig. 1 is a plan view of one embodiment of the device in which the parts are arranged for the positioning in an articulator of a lower biteplate and cast provided with a Gothic arch tracing.

Fig. 2 is a plan view of the same device in which the parts are arranged for the positioning in the articulator of an upper biteplate and its cast when the upper biteplate is provided with the Gothic arch tracing.

Figs. 3 and 4 are sectional views taken along lines 3—3 and 4—4, respectively, of Fig. 2.

Fig. 5 is a perspective view of an upper biteplate provided with a path marker and a lower biteplate provided with a registering table.

Fig. 6 is a view of a modified form of transversely adjustable seating member for the free end of a calibrated extensible member.

Fig. 7 is a plan view of another embodiment of the device in which the parts are arranged for the positioning, in a fragmentarily illustrated portion of an articulator, of a lower bite block and cast provided with a Gothic arch tracing.

Fig. 8 is a view similar to Fig. 7 but showing the same device in which the parts are arranged for the positioning in the articulator of an upper biteplate and its cast when the upper biteplate is provided with the Gothic arch tracing.

Fig. 9 is a sectional view taken on the line 9—9 of Fig. 7.

Fig. 10 is a sectional view taken on the line 10—10 of Fig. 7.

Fig. 11 is a plan view of the embodiment of the device illustrated in Figs. 7 and 8 but showing still another form of supporting means attachable to an articulator, the parts of the device being illustrated in this figure for the positioning in an articulator of a lower biteplate and cast provided with a Gothic arch tracing.

Fig. 12 is a fragmentary sectional view of another embodiment of pivot means which may be provided on the pivot supporting means of the embodiments illustrated respectively in Figs. 7 and 8, and Fig. 11.

Referring first to Fig. 1, in which one embodiment of my device is illustrated as being set up for the positioning in an articulator of a lower biteplate, provided with a Gothic arch tracing, it will be noted that it comprises a pair of L-shaped members 10 and 11 pivotally secured to each other at the outer lower ends of their bases by a threaded stud 12 secured to the base of member 10 and passing through a hole in the base of member 11, the stud having threaded thereon a knurled lock nut 13. The longer arms 14 and 15, respectively, of members 10 and 11 are provided with longitudinally extending channels 16 and 17, respectively. These channels are adapted to slidably receive the longer arms of a second pair of L-shaped members 18 and 19. The latter longer arms, that is, the longer arms of L-shaped members 18 and 19, are provided with longitudinally extending slots 20 and 21, respectively, which ride on threaded studs 22 and 23, secured respectively to the longer arms 14 and 15 of the pivotally connected L-shaped members 10 and 11. L-shaped members 18 and 19 are thus adjustable longitudinally of L-shaped members 10 and 11 and effectively serve as extensible arms thereof. Knurled nuts 24 and 25 are adapted to be threaded respectively on studs 22 and 23 and provide means for maintaining members 18 and 19 in any of their extended positions.

L-shaped members 10 and 11, which, as stated, are pivotally secured together by stud 12 and nut 13, are assembled so that their longer arms 14 and 15 cross to form generally a figure X. A locking member 26, having a longitudinally extending slot 27 formed therein, is pivotally secured at one end to a boss 28 on the outer end portion of arm 15 of member 11 and is adjustably secured to arm 14 of member 10 by reason of a threaded bolt 29 passing through a boss 30, which extends from arm 14, and through slot 27. A knurled nut 31 is mounted on bolt 29 and is adapted to maintain locking member 26 in fixed relation to arm 14 when it is threaded tightly on bolt 29. By this means, the device may be adjusted so that the straight line edges 32 and 33, respectively, of the bases of members 10 and 11 may be fixedly maintained at various angles with respect to one another. A calibrated scale is provided along each of straight edges 32 and 33 of members 10 and 11 as well as along each of the longer arms of adjustable members 18 and 19 for purposes which will be described below.

Referring next to Fig. 5, there are illustrated upper and lower biteplates provided with Gothic arch tracing instruments of the extra-oral type which are well known in the art, but which will be briefly described in order to clarify a subsequent description of the use of my device. Upper biteplate 40 has mounted on its front portion an outwardly extending bracket 41 which carries at its outer end a marker 42. Lower biteplate 43 has mounted on its forward end a registering table 44. When biteplates 40 and 43 are placed in a patient's mouth and the patient moves his jaws through all their relative closed positions, a Gothic arch tracing will be described on registering table 44 by marker 42. Such a tracing is shown in the drawings at 45. The extra-oral type of Gothic arch tracing device, as here shown, is shown merely for clarity's sake, it being understood of course that my device will serve equally as well to position biteplates provided with Gothic arch tracings resulting from the use of intra-oral tracing devices.

In order to position a lower biteplate and its supporting cast (not shown), my device is placed on the biteplate and adjusted until straight edges 32 and 33 lie in the vertical planes respectively of the greatest straight line lengths of segments 45a and 45b of the Gothic arch tracing 45, the greatest straight line length of one segment being represented by a straight line between the apex of the Gothic arch tracing and the point on that segment most remote from the apex. When my device has been thus adjusted, knurled nut 31 is tightened up on bolt 29, thereby fixedly maintaining straight edges 32 and 33 in their proper angular relationship. The device is then secured in place on the biteplate by means of screwing it thereto or by sticking it thereto with wax. In order to more easily position the device on the biteplates with straight edges 32 and 33 in proper position, guides in the form of small rectangular blocks might first be positioned and attached, as by wax, on the registering table with their straight edges aligned with the greatest straight line length of each of the segments 45a and 45b of the Gothic arch tracing, so that in positioning and adjusting my device, straight edges 32 and 33 might merely be brought up to and in contact with the referred to straight edges of the rectangular blocks. With the device so positioned on biteplate 43, any line perpendicular to the straight edges 32 or 33 will, additionally, be perpendicular to the longest chords of arcuate segments 45a or 45b of the Gothic arch tracing. By means of the calibrated scales along edges 32 and 33, the mid-point of the chords of the arcuate segments 45a and 45b may be readily determined and perpendiculars to the chords through such midpoints should pass through the vertical axes of lateral rotation of the patient's jaws or of an articulator which will simulate the movement of the patient's jaws.

When the device has been thus positioned on biteplate 43, its adjustable arms 18 and 19 are extended equal distances which can be readily accomplished because of the calibrated scales on their longer arms, until, ideally, points on their free ends directly above the mid-points of the arcuate segments 45a and 45b, that is, points on the perpendicular bisectors of the longest chords of the segments, are the same distance apart as are the lateral rotational centers of the patient's jaws or the vertical rotational axes of the articulator. The biteplate, with the attached device, is then ideally placed in the articulator and positioned so that the referred to points on the free ends of members 18 and 19 lie on the vertical axes of lateral rotation of the articulator. Thus, the biteplate would be located in the articulator so that the lateral motions provided it by the articulator would simulate exactly the lateral motions provided it by the patient's jaws. However, as the vertical axes of lateral rotation of an articulator are not readily determinable, at least physically, by a user thereof, I have provided means at the free end of each of the L-shaped members 18 and 19 which eliminate the necessity of the particular user determining for himself the location of the vertical axes of lateral rotation of the articulator.

These means consist of transversely adjustable members 46 and 47 mounted on the rectangularly shaped base portions 48 and 49 of extensible members 18 and 19, respectively, and secured respectively thereto by screws 50 and 51. Both of the members 46 and 47 are similarly mounted on base portions 48 and 49, and from Figs. 3 and 4, it can be seen that the members are bifurcated and adapted to receive part of base portions 48 and 49 between their bifurcated arms. Base portions 48 and 49 of members 18 and 19 are each provided with a calibrated scale corresponding respectively to those along straight edges 32 and 33 of members 10 and 11. These scales are located on base portions 48 and 49 so that they will lie adjacent the lower edges of transversely adjustable members 46 and 47 and so that if a perpendicular is erected on, for instance, edge 32 and passes through one of the calibrations thereon, such perpendicular will also pass through the corresponding calibration of the scale on base portion 48. An arrow or similar indicating marker 52 is formed on the edges of members 46 and 47 adjacent the last-mentioned scales. Thus if there is a slight variation in the lengths of the segments of Gothic arch tracings of various patients, and consequently, perpendiculars erected on the midpoints of the longest chords of the segments will not coincide so that the above-referred-to point on the free ends of members 18 and 19 (or on members 46 and 47) will not be the same for the various patients, compensatory adjustments may be made by moving members 46 and 47 transversely of members 18 and 19. The proper adjustment of members 46 and 47, for use of the device in positioning the biteplates of any patient, is such that the arrows or indicating markers 52 are located directly opposite the calibrations on the scales of base portions 48 and 49, which correspond respectively to the calibrations of the scales along edges 32 and 33 which represent the mid-points of the segments of the Gothic arch tracing. Notches 53 and 54 are provided in the edges of members 46 and 47 opposite the edges on which are contained the arrows or markers 52. These members 46 and 47 and their notches 53 and 54 are designed for use of the device with a particular type of articulator and when the device is so used with this type of articulator for locating a biteplate to which it has been attached, as previously described, it will properly locate the biteplate within the articulator when (1) members 46 and 47 are properly adjusted, (2) members 18 and 19 are extended equal distances and (3) the notches 53 and 54 engage the substantially vertical posts of the back frame of the articulator at the height of the occlusal plane. It will thus be understood then that for use with various types of well known articulators, my device to be complete must include a set of members 46 and 47, which have been provided with notches 53 and 54, or other means, designed especially for each of those particular articulators. In other words, a user is therefore provided with a set of members 46 and 47 for each type of articulator which he may have occasion to use.

When the lower biteplate 43 has thus been properly located within the articulator by use of my device, its supporting cast is attached to the lower articulator bow. Once the lower biteplate and its supporting cast are properly fixed in the articulator, the positioning of the upper biteplate is a relatively simple matter. It will be noted in Fig. 5 that the biteplates 40 and 43 are provided with notches 40' and 43' in their outer sides respectively. When the biteplates are located within the patient's mouth for the purpose of obtaining a Gothic arch tracing and are in the centric position with respect to one another, a modeling compound or plaster is made use of to form bite blocks. These bite blocks will only properly seat subsequently in notches 40' and 43' of the upper and lower biteplates when they are in centric relation with respect to one another. Thus, to properly position the upper biteplate in the articulator, once the lower biteplate has been properly positioned, is an easy matter, for it may be placed in the articulator along with its supporting cast and adjusted until the bite blocks referred to will properly seat in the notches 40' and 43' at the same time that marker 42 is at the apex of the Gothic arch tracing 45. When in proper position, the supporting cast (not shown) of the upper biteplate 40 is secured to the upper articulator bow. The biteplates are thus properly positioned in the articulator for the setting therein of artificial teeth.

When the Gothic arch tracing is made on a registering table secured to an upper biteplate, the path marker thus being secured to the lower biteplate, it will be reversed, that is, instead of having its segmental arms diverging toward the biteplate, it will have them diverging away from the biteplate. This is understandable and well known in view of the fact that it is the lower jaw, only, that moves relative to the rest of the patient's head structure. For properly positioning an upper biteplate, provided with such a Gothic arch tracing in an articulator, the arrangement of the parts of my device must be somewhat changed. This changed arrangement may be seen in Fig. 2 of the drawings. It will be noted that members 10 and 11 are pivotally secured together at points adjacent the inner ends of their lower edges rather than at points adjacent the outer ends thereof as previously described. This is accomplished by means of threaded stud 55 mounted on member 11 and a hole 56 in the base portion of member 10. The operation of the device is, however, the same in positioning an upper biteplate as it was in the positioning of the lower biteplate.

A modified form of a transversely adjustable member, adapted to be mounted on one of the base portions of an extensible member of my device, is shown in Fig. 6. The particular member here shown is adapted to be mounted on the base portion of extensible member 18 when a similar one is mounted on the base portion of extensible member 19. Instead of being provided with a notch 53, however, to engage one of the vertical posts of the articulator, it is provided with an outwardly extending arm or bracket 57 which performs the same function. Thus the post of the articulator is, with this form of transversely adjustable member, adapted to be received in the corner of the member indicated at 58, which is formed by arm 57 and edge 59.

Edge 59 may also be provided with a calibrated scale for the user who is provided with other than a well known or widely used type of articulator. By means of this calibrated scale, the user may, with a fair degree of accuracy, position his device in his articulator by choosing the calibration on this scale which is directly opposite the pointer or marker 52 and locating such calibration as close as possible to a vertical axis of lateral rotation of his articulator. When edge 59 is provided with a scale for the user who is provided with other than a well known type of articulator for which no standard set of adjustable members is made, it is of course apparent that no notch or extended arm 57 will be provided for the adjustable member.

Referring to Figs. 7 and 8, another embodiment of my invention is illustrated therein. As in the previously described embodiment, a pair of longitudinally extensible members 60 and 62 are provided which function similarly to the member of said previously described embodiment. The member 60 has an arm 64 which is provided with a calibrated scale 66. Said arm also has a slot 68 which extends longitudinally thereof a substantial distance. One end of said arm also has a first bearing aperture 70 and a lateral extension 72 which is provided with a second bearing aperture 74.

The opposite end of the arm 68 is received within a channel 76 of a second arm 78 comprising part of the member 60. The arms 64 and 78 are thus arranged for relative longitudinal movement and, in effect, relatively telescope. The second arm 78 is provided with an end portion comprising means 80 having a straight edge 82 disposed at a right angle to the longitudinal axis of the member 60. Measuring calibrations 84 are arranged along said straight edge. A threaded stud 86 is fixed to the second arm 78 adjacent one end and is received within the slot 68 of the arm 64 and a locking thumb nut 88 is threaded on the stud 86 to clampingly lock the arm 64 in any desired position of extension relative to the second arm 78 of member 60.

The member 62 is similar to the member 60 and comprises an arm 90 having a longitudinal slot 92 and measuring calibrations 94, as well as a first bearing aperture 96 and a lateral projection 98 provided with a second bearing aperture 100. The arm 90 is telescopically received within a channel 102 of second arm 104, on one end of which is an end portion comprising means 106 having a straight edge 108 extending at a right angle to the longitudinal axis of member 62. Measuring calibrations 110 are provided along the straight edge 108. Likewise, a threaded stud 86 and locking thumb nut 88 effect locking of the arms 90 and 104 in desired operative positions of adjustment.

The members 60 and 62 are supported in operative relation by a plate-like bracket 112 which has means illustrated herein as notches 114 which respectively engage fragmentarily illustrated arms 116 of a well known type of mechanical articulator. The bracket 112 is detachably secured to the articulator arms and supported thereby approximately at the level of the occlusal plane which substantially is the plane at which the teeth interdigitate in a human mouth. Any suitable means may be used to secure the bracket 112 to the articulator and, when attached to the articulator, the bracket will be in fixed relationship to the base of the articulator.

The bracket 112 is provided with a pair of pivots 118 and 120 which preferably comprise pintles projecting vertically from one surface of the bracket 112. When the device is being used to relate or position a lower biteplate and cast in an articulator and the biteplate and cast are provided with a Gothic arch tracing, the members 60 and 62 are disposed as shown in Fig. 7, wherein the end portions 80 and 106 of said members overlap to disposed the straight edges 82 and 108 at an obtuse angle conforming to the Gothic arch tracing. The apex of the angle outlined by the straight edges 82 and 108 coincide with the apex of the Gothic arch. To achieve this, the members 60 and 62 are longitudinally extended or contracted while the first bearing apertures 70 and 96 thereof are pivotally supported by the pivots 118 and 120 on bracket 112.

As described in regard to the first embodiment described above, coincidence of the straight edges 82 and 108 with the Gothic arch tracing may be facilitated by using guides in the form of small rectangular blocks which may be attached, as by wax, on the registering table 44 with their straight edges aligned with the greatest straight line length of each of the segments 45a and 45b of the Gothic arch tracing as shown in Fig. 5. Thus, the straight edges 82 and 108 need merely to be brought into contact with the referred to straight edges of the rectangular blocks (not illustrated).

With the device so positioned on biteplate 43, any line perpendicular to the straight edges 82 and 108 will be perpendicular also to the longest chords of the arcuate segments 45a or 45b of the Gothic arch tracing illustrated in Fig. 5. Further, by means of the scales comprising the measuring calibrations 84 and 110 along said straight edges, the midpoint of the chords of the arcuate segments 45a and 45b may readily be determined. For practial purposes, however, assuming, for example, that the second arms 78 and 104 are 10 mm. wide, by using only a 10 mm. chord of a Gothic arch segment, and coinciding therewith the 10 mm. portions of the calibrated scales 84 and 110 extending respectively from the angle apex as shown in Fig. 7, the midpoint of said 10 mm. chords may be determined readily. When perpendiculars are erected to said midpoints parallelly to the longitudinal axes of said members, said perpendiculars will intersect said first bearing apertures 70 and 96 of said members. The axes of the pivots 118 and 120 will then correspond to the vertical axes of the lateral rotation of the patient's jaws or of an articulator which will simulate the movement of the patient's jaws.

When the device is used for relating or positioning in the articulator an upper biteplate and its cast, when the upper biteplate is provided with a Gothic arch tracing, the members 60 and 62 are arranged as illustrated in Fig. 8, wherein the second bearing apertures 74 and 100 are respectively positioned for rotation on the pivots 118 and 120 and the extensions 122 and 124 on the opposite ends of said members are arranged, for example, in end to end contact as shown in Fig. 8 so as to correspond to the Gothic arch tracing which is described by the marker 42 when the Gothic arch tracing is secured to the upper biteplate and its cast. Preferably, the bearing apertures 74 and 100, when longitudinally projected parallelly to the axes of the members 60 and 62, will intersect the midpoints of the calibrations on the extensions 122 and 124 which, for convenience, may each be 10 mm. long for example. The coordination of the straight edges 82 and 108 with the Gothic arch tracing will be similar to that described above relative to Fig. 7 wherein the members are arranged for use relative to a Gothic arch tracing attached to a lower biteplate and cast. It is understood of course by those familiar with the art that when the Gothic arch tracing plate is attached to the lower or movable jaw, and the stylus is supported by the upper or stationary jaw, a tracing similar to that shown in Fig. 5 is obtained. However, when the tracing plate and stylus assembly are reversed as to the jaws, a tracing opposite to that shown in Fig. 5 is obtained and thus the reason for the arrangement of the members shown in Fig. 8.

Still another embodiment of the invention is illustrated in Fig. 11 wherein the members 60 and 62 are constructed and function the same as said members in the embodiment shown in Figs. 7 and 8. However, in the embodiment of Fig. 11, wherein the members 60 and 62 are shown positioned for use relative to a Gothic arch tracing provided on a lower biteplate and cast, a plurality of brackets 126 and 128 are illustrated in fixed, predetermined relation to portions of an articulator such as fragmentarily illustrated arms 116 thereof. However, the fixed relationship of the brackets 126 and 128 to the articulator is such that the pivots 118 and 120 are substantially in the same fixed relationship to each other and the articulator as is provided by the unitary bracket 112 of the embodiment shown in Figs. 7 and 8. It will be understood of course that while the brackets 126 and 128 in Fig. 11 are substantially L-shaped, any other suitable shape of brackets may be used to accomplish the same basic purpose. Further, the brackets 126 and 128 are positioned so that they are supported by the articulator approximately at the level of the occlusal plane and are affixed to the articulator by any suitable means. Otherwise, the function and operation of the members 60 and 62 in this embodiment is the same as in the embodiment shown in Figs. 7 and 8.

In certain well known kinds of mechanical articulators, adjustments are provided so that the articulator may be arranged to conform to various distances between the vertical axes of lateral rotation of a patient's jaws and to thereby permit very precise orientation of the artificial dentures being furnished an individual patient. When the device described above and particularly in the embodiments shown respectively in Figs. 7 and 8 and Fig. 11 are used in an adjustable articulator of said nature, it is preferable that the pivots 118 and 120 may be adjusted relative to either the unitary bracket 112 or the several brackets 126 and 128.

To this end, there is illustrated in Fig. 12, mechanism by which the pivots 118 and 120 may be adjusted relative to their supporting brackets. In said figure, the pivot 118 or 120 is provided with a threaded stud 130 having a locking thumb nut 132 threaded thereon. The brackets 112, 126 or 128 are provided preferably with a circular opening 134 of suitable size. For practical purposes and by way of example, the diameter thereof may be within the range of between ½" and ¾". The stud 130 has, for example, a diameter of ⅛" or less. A washer-like member 136, having a diameter of at least twice that of the opening 134 is fixed to the stud 130 and a similar washer-like member 138, which has a central aperture only slightly larger than the stud 130, receives said stud through said central aperture. From said figure it will readily be seen that the pivots 118 and 120 may readily be adjusted relative to the brackets 112, 126 or 128 to conform to the adjustment of the articulator. When the pivot has been moved to the desired position relative to the bracket, the threaded nut 132 is tightened so as to locate the pivot in fixed position relative to the bracket and the other pivot, thereby conforming the pivots to the adjustment of the articulator.

While the longitudinally extensible members in the several embodiments of the invention are shown to be generally flat and one arm of each member has a channel to receive the other arm of the member, it is nevertheless to be understood that the members may be formed, for example, with one arm tubular and the other a solid rod telescoping therewith.

When using the instrument in relation to intra-oral Gothic arch tracings, the members 60 and 62 will obviously be shorter than for extra-oral use. Such shorter members can be provided by furnishing, for example, a pair of shorter arms 64 and 90 for cooperation with the second arms 78 and 104. Likewise relative to the members 18 and 19 of the embodiment shown in Figs. 1 through 4.

It can thus be seen that by use of either of the several embodiments of my novel device, which are of extreme simplicity in structure and use, upper and lower biteplates may be accurately and easily positioned in an articulator without any of the undesirable features of the trial-and-error method of positioning and without any of the complicated, time-consuming, and awkward features involved with the use of the face bow. It should, of course, be understood that numerous changes and modifications may be made in said embodiments of my device, the preferred forms only of which have been shown and described, without departing from my invention, as set forth in the appended claims.

I claim:

1. A device for use in the positioning of biteplates and casts in a mechanical articulator which comprises a pair of longitudinally extensible members pivotally secured together at one end, and means at the pivoted end of each member defining a straight line at right angles to the longitudinal axis of said member.

2. A device for use in the positioning of biteplates and casts in a mechanical articulator which comprises a pair of longitudinally extensible members pivotally secured together at one end, the pivoted end of each member having a straight edge extending at right angles to the longitudinal axis of said member.

3. A device for use in the positioning of biteplates and casts in a mechanical articulator which comprises a pair of longitudinally extensible members pivotally secured together at one end, the pivoted end of each member having a straight edge extending at right angles to the longitudinal axis of said member and the free end of each member having a notch formed therein so that said free end will seat on a vertical back frame post of the articulator.

4. A device as set forth in claim 2 in which the free end of each extensible member has a calibrated transverse edge.

5. A device as set forth in claim 2 which includes means incorporated in each extensible member for measuring the extension of said member.

6. A device as set forth in claim 2 which includes a locking member secured at one end to one of said extensible members outwardly from the pivoted end thereof and adjustably securable to the other of said extensible members outwardly from the pivoted end thereof.

7. A device as set forth in claim 2 in which each extensible member comprises two L-shaped members the longer arms of which are adjustably secured to each other and relatively movable longitudinally of each other.

8. A device for use in the positioning of biteplates and casts in a mechanical articulator which comprises a pair of members pivotally secured together at one end, and a calibrated member slidably mounted on each of said first-mentioned members and adapted to be slid longitudinally thereof, the pivoted end of each of said first-mentioned members having a straight edge extending at right angles to the longitudinal axis of said member.

9. A device for use in the positioning of biteplates and casts in a mechanical articulator which comprises a pair of L-shaped members pivotally secured to each other at points on their bases, a calibrated member slidably mounted on each of the longer arms of the L-shaped members and adapted to be slid longitudinally thereof, and means for maintaining the L-shaped members in any of their relative positions.

10. A device as set forth in claim 9 which includes means for maintaining each of the slidable members in any of its extended positions.

11. A device as set forth in claim 9 in which the calibrated members are also L-shaped, the calibrations being along the longer arms thereof and said longer arms being longitudinally slidable on the longer arms of the pivotally secured L-shaped members.

12. A device for use in the positioning of biteplates and casts in a mechanical articulator which includes a longitudinally extensible member means at one end of said extensible member defining a straight line at right angles to the longitudinal axis of said member, and a member at the other end of said extensible member adapted to be seated on a vertical back frame post of the articulator and mounted on said other end for adjustment thereon transversely of the longitudinal axis of said extensible member.

13. A device as set forth in claim 12 in which the transversely adjustable member is provided along its free outer edge with means for engaging the back frame post of the articulator to position the longitudinally extensible member in a predetermined position relative to the articulator when said engaging means engages said back frame post.

14. A device for use in the positioning of biteplates and casts in a mechanical articulator which includes a longitudinally extensible member, said member having at one of its ends a straight edge extending at right angles to the longitudinal axis of said member, a calibrated scale along said straight edge, a corresponding calibrated scale at the other end of said extensible member, a seating member mounted on said other end of the extensible member and adjustable transversely of the longitudinal axis of the extensible member, one edge of said seating member extending along said last-mentioned calibrated scale and having a marker thereon for locating said adjustable member with respect to said last-mentioned calibrated scale, and means along the opposite edge of said adjustable member for engaging a substantially vertical back frame post of the articulator to position the longitudinally extensible member in a predetermined position relative to the articulator when said engaging means engages said back frame post.

15. A device for use in the positioning of biteplates and casts in a mechanical articulator which comprises a pair of longitudinally extensible members pivotally secured together at one end, the pivoted end of each member having a calibrated straight edge extending at right angles to the longitudinal axis of said member, a corresponding calibrated scale at the other end of each of said extensible members, a seating member mounted on said other end of each extensible member for adjustment transversely of the longitudinal axis of said extensible member and having one edge disposed along the calibrated scale at this end of said extensible member, said one edge of the seating member having a marker thereon for positioning said seating member with respect to said last-mentioned calibrated scale, means along the opposite edge of each of said seating members for engaging a back frame post of the articulator to position each longitudinally extensible member in a predetermined position relative to the articulator when said engaging means engages said back frame post, and a locking member secured at one end to one of said extensible members outwardly from the pivoted end thereof and adjustably securable to the other of said extensible members outwardly from the pivoted end thereof.

16. A device for use in the positioning of biteplates and casts in a mechanical articulator and comprising a pair of longitudinally extensible members, means pivotally supporting one end of each member for rotation about an axis and said axes being in fixed relation to each other, and means at corresponding ends of each member defining a straight line at a right angle to the longitudinal axis thereof.

17. A device as set forth in claim 16 in which the axes of said pivotal means are spaced from each other.

18. A device for use in the positioning of biteplates and casts in a mechanical articulator and comprising in combination, bracket means attachable in fixed relation to said articulator, pivots supported by said bracket means in predetermined fixed relation to each other, a pair of longitudinally extensible members respectively pivotally supported at one end by said pivots for rotation thereabout, and means at the opposite ends of each member defining a straight line at a right angle to the longitudinal axis thereof.

19. A device as set forth in claim 18 in which said bracket means is a plate having portions arranged to engage and be secured to parts of a mechanical articulator.

20. A device as set forth in claim 19 in which said pivots comprise pintles supported by said plate and projecting vertically from one surface thereof.

21. A device for use in the positioning of biteplates and casts in a mechanical articulator and comprising in combination, bracket means attachable in fixed relation to said articulator, pivots supported by said bracket means in pre- determined fixed relation to each other, a pair of longitudinally extensible members each having one end provided with a first bearing and a second bearing laterally spaced therefrom, said first and second bearings in said members being selectivley engageable with said pivots depending upon whether said device is being used to orient with the articulator a lower or an upper biteplate and cast provided with a Gothic arch tracing, and means at the opposite end of each member defining a straight line at a right angle to the longitudinal axis thereof.

22. A device as set forth in claim 21 in which said means at the opposite ends of said longitudinal members comprise lateral extensions and the portions thereof defining a straight line have measuring means associated therewith.

23. A device as set forth in claim 18 which includes means for fixedly securing each longitudinally extensible member in a plurality of extended positions.

24. A device as set forth in claim 18 in which means are combined with each extensible member for measuring the extension thereof.

25. A device for use in the positioning of biteplates and casts in a mechanical articulator and comprising in combination, a plurality of bracket means attachable respectively in fixed relation to portions of said articulator within a plane approximately at the level of the occlusal plane, pivots respectively supported by said bracket means in predetermined fixed relation to each other, a pair of longitudinally extensible members respectively pivotally supported at one end by said pivots for rotation thereabout, and means at the opposite ends of each member defining a straight line at a right angle to the longitudinal axis thereof.

26. A device for use in the positioning of biteplates and casts in an adjustable mechanical articulator and comprising in combination, bracket means attachable in fixed relation to said articulator, pivots adjustably supported by said bracket means to conform to a predetermined adjustment of said articulator, locking means engageable with said pivots and operable to secure said pivots in predetermined fixed relation to said bracket means and to each other, a pair of longitudinally extensible members respectively pivotally supported at one end by said pivots for rotation thereabout, and means at the corresponding ends of each member defining a straight line at a right angle to the longitudinal axis thereof.

JEROME E. BRASSIE.

References Cited in the file of this patent

UNITED STATES PATENTS

| Number | Name | Date |
|---|---|---|
| 243,517 | Cruttenden | June 28, 1881 |
| 1,804,567 | Pray | May 12, 1931 |
| 2,225,274 | MacGoun | Dec. 17, 1940 |
| 2,418,648 | Kile | Apr. 8, 1947 |